US006476757B1

(12) United States Patent
Rhodes

(10) Patent No.: US 6,476,757 B1
(45) Date of Patent: Nov. 5, 2002

(54) SECURE I/P

(75) Inventor: Laddie T. Rhodes, Oxon Hill, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 05/300,041

(22) Filed: Oct. 24, 1972

(51) Int. Cl.[7] ............................................. G01S 13/78
(52) U.S. Cl. ............................ 342/45; 342/36; 342/37; 342/30
(58) Field of Search ..................... 343/6.5 R, 6.5 LC, 343/6.8 R, 6.8 LC; 342/45, 30, 32, 36, 37, 42, 44, 46, 51

(56) References Cited

U.S. PATENT DOCUMENTS

| 3,182,310 A | * | 5/1965 | Humpherys | 343/6.8 LC |
| 3,375,516 A | * | 3/1968 | Hart et al. | 343/6.8 LC |
| 3,701,150 A | * | 10/1972 | Dame | 343/6.8 R |
| 3,715,750 A | * | 2/1973 | Bishop | 343/6.8 LC |
| 4,074,263 A | * | 2/1978 | Sullivan | 342/45 |
| 4,198,632 A | * | 4/1980 | Bishop | 342/45 |
| 4,322,729 A | * | 3/1982 | Honold et al. | 342/45 |
| 5,101,208 A | * | 3/1992 | Parker et al. | 342/45 |
| 5,223,839 A | * | 6/1993 | Grossman | 342/43 |
| 5,426,434 A | * | 6/1995 | Bishop | 342/45 |
| 6,420,995 B1 | * | 7/2002 | Richmond et al. | 342/45 |

* cited by examiner

Primary Examiner—John B. Sotomayor
(74) Attorney, Agent, or Firm—John J. Karasek; Dorothy I. Becker

(57) ABSTRACT

An improvement in the present radar/IFF equipment used by the military whereby the transponding equipment, when used in crypto-secure Mode 4, is enabled to reply with its unique coded identification number (Mode 2 reply) after it has made its Mode 4 reply. This is accomplished by adding an AND gate and a delay means to the present equipment. The AND gate is connected to couple the Mode 4 three-pulse interrogation to the delay means if it is received at the same time the I/P activate switch is in its operating position. The delayed three-pulse interrogation signal is coupled to the encoder and activates a Mode 2 reply.

The ground equipment is also modified to enable it to faithfully reproduce the entire video output of its interrogator section.

2 Claims, 1 Drawing Sheet

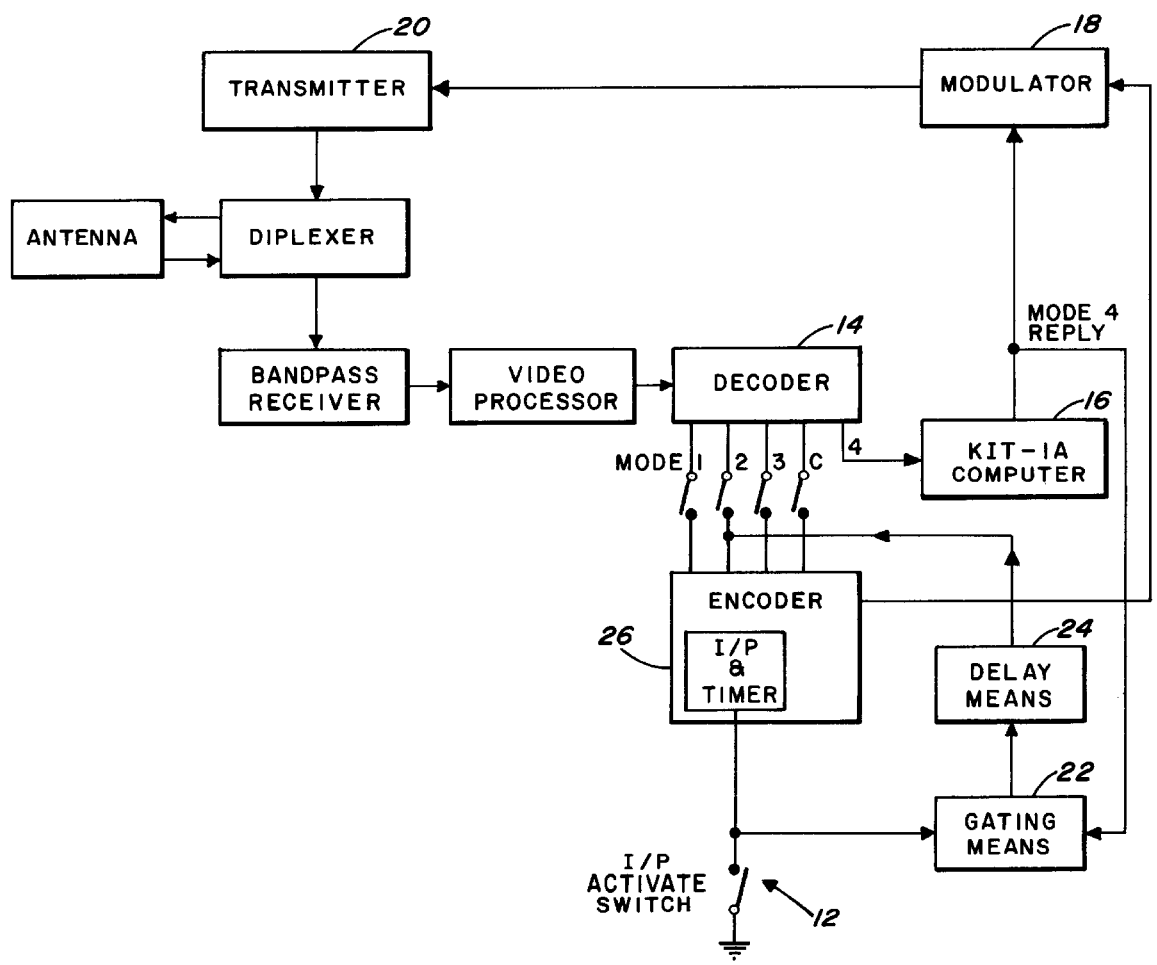

SECURE I/P

BACKGROUND OF THE INVENTION

Along both the development of radar and its ability to detect targets came the problem of identification of the target. Several identification systems have been widely used. Most noteworthy of these systems are the Mark X (SIF) and, more recently, the Mark XII. The advent of jet aircraft with a relatively small reflective area reduced the range of detection by radars to a degree unacceptable for operational use. To provide for the tracking of friendly aircraft, Mark X IFF, a beacon system, was used on a continuous interrogation basis to track those aircraft so equipped. The capability to distinguish "friend from friend" was provided by an addition to the basic Mark X system, the Selective Identification Feature (SIF). The SIF addition provided reply-path coding on operating Modes 1, 2 and 3.

Mode 4 is the only crypto-secure identification mode available today. However, the reply does not provide unique airframe identification, so that it is impossible to identify friend-from-friend when only this mode has to be employed.

SUMMARY OF THE INVENTION

This invention is a modification to the present Mark XII-type, military radar/IFF equipment to enable the transponder to reply to a Mode 4 interrogation signal with its Mode 2 unique airframe identification signal in addition to the Mode 4 response. The transponder is modified by adding an AND gate and a delay means, the Mode 4 response from the computer being fed to the AND gate and passing through only when the I/P switch is activated. The output of the AND gate is delayed till the Mode 4 response is transmitted, and then fed to the encoder which thereupon is activated to supply a Mode 2 unique identification signal to be transmitted.

The ground equipment is modified by adding the equipment needed to enable the computer presently used to faithfully reproduce the entire received signal. The proper time decoding for the new, combined Mode 4 signal is not now provided.

An object of this invention is to provide presently used military IFF equipment, such as the AN/TPQ-27 IFF system and the airframe transponder used therewith, with the capability of sending and receiving a unique identification signal when operating in the crypto-secure mode.

Other objects, advantages and novel features of the invention will become apparent from the following detailed description of the invention when considered in conjunction with the accompanying drawings wherein:

DESCRIPTION OF THE DRAWING

The single figure is a block diagram of the invention in conjunction with a simplified version of the transponding equipment with which it is employed.

DETAILED DESCRIPTION

FIG. 1 shows in simplified form a block diagram of an air-borne transponder of an AIMS-Mark XII-Type IFF system. (AIMS-Air Traffic Control Radar Beacon System IFF Mark XII System). In this system, which is used by the military as well as civilian aircraft, although civilian aircraft do not use the crypto-secure Mode 4, the Mode 4 response is 3 pulses time-jittered by the computer in any of 16 positions for secure I/P (identification of position). However, the Mode 4 response does not provide identification of the aircraft which gives the response; this is only provided by the Mode 2 response which is unique to each aircraft. The Mode 2 response provides 8192 different codes or groups of pulses, having 15 pulse positions.

To identify friend-from-friend in the crypto-secure mode of operation, a Mode 4 plus a Mode 2 response is required. FIG. 1 shows a modification in the airborne transponder which will provide such an output signal.

In the present Mark XII type equipment when Mode 4 activate (challenge) switches are activated a crypto-secure challenge is transmitted from the interrogator to the transponder. The decoded Mode 4 interrogation signal is sent from the decoder 14 to the Mode 4 computer 16 (KIT-1A) which provides a time-jittered crypto-secure Mode 4 reply signal to the modulator 18.

The modification which allows a Mode 2 signal to be transmitted after the Mode 4 reply comprises gating means 22 and delay means 24. The gating means 22, which may be AND gate, must have an input at two electrodes to conduct (switch-closed condition). The I/P-activate switch 12 must be closed, thereby grounding one electrode, and a Mode 4 reply signal must be fed to the other input electrode. The Mode 4 reply signal is taken from the Mode 4 computer 16 and fed both to the gating means 22 and to the modulator 18 and transmitter 20.

Once through the gating means 22, the Mode 4 signal is delayed by delay means 24 by about 7.2 microseconds, although other delays may be employed. The delayed signal is then fed into the encoder 26 on the Mode 2 input, so that the encoder puts out its normal Mode 2 reply signal to the modulator 18 except that the Mode 2 signal is delayed 7.2 microseconds behind the first pulse of the Mode 4 reply signal. Thus, a Mode 2 identification signal is transmitted after every Mode 4 reply.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In combination with the transponder of an AIMS which includes a decoder having at least Mode 2 and Mode 4 output terminals, an encoder having at least a Mode 2 input terminal, an I/P-activate switch, one side of which is grounded, the other side being connected to said encoder, a mode switch connected between the Mode 2 output terminal of said decoder and the Mode 2 input terminal of said encoder, a Mode 4 computer having a Mode 4-reply output terminal and receiving as an input the signal on the Mode 4 output terminal of said decoder, apparatus comprising:

gating means coupled to the ungrounded side of said I/P-activate switch and to receive the Mode 4 signal from said decoder, said gating means being normally in a switch-open condition but being placed in a switch-closed condition by receipt of a Mode 4 reply signal from said computer when said I/P-activate switch is closed; and delay means, coupled to receive the output of said gating means, for delaying its input signal by a predetermined amount of time, the output of said delay means being coupled to the Mode 2 input terminal of said encoder to active the encoder to generate a Mode 2 reply signal, whereby a Mode 2 identification signal is transmitted after every Mode 4 reply.

2. In an AIMS-Mark XII-type aircraft IFF transponder including a decoder having at least Mode 2 and Mode 4 output terminals, an encoder have at least a Mode 2 input terminal, an I/P-activate switch, one side of which is grounded, the other side being connected to said encoder, a mode switch connected between the Mode 2 output terminal of said decoder, and the Mode 2 input terminal of said encoder, a Mode 4 computer having a Mode 4-reply output terminal and receiving as an input the signal on the Mode 4 output terminal of said decoder, means comprising:

gating means coupled to the ungrounded side of the I/P-activate switch and to the Mode 4-reply output terminal of said computer, said gating means being normally in a switch-open condition but being placed in a switch-closed condition by the simultaneous closure of the I/P-activate switch and receipt of a Mode-4-reply signal from said computer; and delay means, coupled to receive the output of said gating means, for delaying its input signal by a predetermined amount, the output of said delay means being coupled to the Mode 2 input terminal of the encoder of said transponder to activate the encoder to generate a Mode 2 reply signal, whereby a Mode 2 identification signal is transmitted after every Mode 4 reply.

* * * * *